United States Patent
Ohura et al.

(10) Patent No.: US 10,527,323 B2
(45) Date of Patent: Jan. 7, 2020

(54) AIR CONDITIONING APPARATUS

(71) Applicant: DAIKIN INDUSTRIES, LTD., Osaka-shi, Osaka (JP)

(72) Inventors: Ryuuta Ohura, Osaka (JP); Junya Minami, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/065,028

(22) PCT Filed: Nov. 21, 2016

(86) PCT No.: PCT/JP2016/084456
§ 371 (c)(1),
(2) Date: Jun. 21, 2018

(87) PCT Pub. No.: WO2017/110339
PCT Pub. Date: Jun. 29, 2017

(65) Prior Publication Data
US 2018/0372380 A1 Dec. 27, 2018

(30) Foreign Application Priority Data
Dec. 22, 2015 (JP) .................................. 2015-250318

(51) Int. Cl.
*F25B 45/00* (2006.01)
*F25B 13/00* (2006.01)
*F25B 49/02* (2006.01)

(52) U.S. Cl.
CPC .............. *F25B 13/00* (2013.01); *F25B 45/00* (2013.01); *F25B 49/022* (2013.01); *F25B 2313/02741* (2013.01); *F25B 2313/0314* (2013.01); *F25B 2600/2513* (2013.01); *F25B 2700/1933* (2013.01); *F25B 2700/21152* (2013.01)

(58) Field of Classification Search
CPC .................. F25B 45/00; F25B 2345/00; F25B 2345/001; F25B 2345/003; F25B 13/00
See application file for complete search history.

(56) References Cited

U.S. PATENT DOCUMENTS

| 2004/0231352 A1 | 11/2004 | Matsuoka et al. |
| 2009/0114309 A1 | 5/2009 | Sakai et al. |
| 2013/0098072 A1* | 4/2013 | Choi ....................... F25B 13/00 62/77 |

FOREIGN PATENT DOCUMENTS

| JP | 59-145460 A | 8/1984 |
| JP | 2003-28542 A | 1/2003 |
| JP | 2005-241172 A | 9/2005 |
| JP | 2009-109156 A | 5/2009 |
| JP | 2011-85390 A | 4/2011 |

* cited by examiner

*Primary Examiner* — Eric S Ruppert
(74) *Attorney, Agent, or Firm* — Birch, Stewart, Kolasch & Birch, LLP

(57) ABSTRACT

In a case where the total volume of plural indoor heat exchangers is smaller than the volume of an outdoor heat exchanger, a control component performs a heating refrigerant charging operation until a heating refrigerant charging completion condition is met, and thereafter performs a cooling refrigerant charging operation until a refrigerant charging completion condition where a refrigerant circuit is charged with a prescribed quantity of refrigerant is met.

19 Claims, 5 Drawing Sheets

AIR CONDITIONING APPARATUS

TECHNICAL FIELD

The present invention relates to an air conditioning apparatus, and particularly an air conditioning apparatus that is configured as a result of an outdoor unit having an outdoor heat exchanger and plural indoor units having indoor heat exchangers being interconnected via a liquid refrigerant communication pipe and a gas refrigerant communication pipe.

BACKGROUND ART

Conventionally, there have been air conditioning apparatuses that are configured as a result of an outdoor unit having an outdoor heat exchanger and plural indoor units having indoor heat exchangers being interconnected via a liquid refrigerant communication pipe and a gas refrigerant communication pipe. As such an air conditioning apparatus, there is an air conditioning apparatus that is switchable to a cooling cycle state, which causes the outdoor heat exchanger to function as a radiator of refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant. Additionally, as such an air conditioning apparatus, there is, as described in patent document 1 (JP-A No. 2011-85390), an air conditioning apparatus that performs, in the process of charging a refrigerant circuit with the refrigerant after device installation and/or after maintenance, a refrigerant charging operation until the refrigerant circuit is charged with a prescribed quantity of the refrigerant. Here, the air conditioning apparatus of patent document 1 can perform the refrigerant charging operation (a cooling refrigerant charging operation) by switching the refrigerant circuit to the cooling cycle state and perform the refrigerant charging operation (a heating refrigerant charging operation) by switching the refrigerant circuit to the heating cycle state.

SUMMARY OF INVENTION

In the air conditioning apparatus of patent document 1, in a case where the outdoor temperature is low, it is preferred that the air conditioning apparatus perform the heating refrigerant charging operation that performs heating of the rooms, rather than the cooling refrigerant charging operation that performs cooling of the rooms, in order to avoid lowering the indoor temperatures.

Here, in order to charge the refrigerant circuit with the prescribed quantity of the refrigerant, it is necessary to accumulate a large quantity of the refrigerant in the heat exchanger functioning as a radiator of the refrigerant. For this reason, in order to charge the refrigerant circuit with the prescribed quantity of the refrigerant using the heating refrigerant charging operation, it is necessary to accumulate the refrigerant in a large quantity in the plural indoor heat exchangers functioning as radiators of the refrigerant. Additionally, in a refrigerant circuit that is switchable between a cooling operation and a heating operation, the prescribed quantity of the refrigerant is determined by the magnitudes of the volume of the outdoor heat exchanger that functions as a radiator of the refrigerant in the cooling operation and the total volume of the plural indoor heat exchangers that function as radiators of the refrigerant in the heating operation. That is, in a case where the volume of the outdoor heat exchanger is large, the prescribed quantity of the refrigerant is determined by the cooling operation, and in a case where the total volume of the plural indoor heat exchangers is large, the prescribed quantity of the refrigerant is determined by the heating operation.

However, the total volume of the plural indoor heat exchangers changes depending on the number and type (model) of the indoor units connected to the outdoor unit. For this reason, even if one tries to charge the refrigerant circuit with the refrigerant in the heating refrigerant charging operation as described above, in a case where the total volume of the plural indoor heat exchangers is smaller than the volume of the outdoor heat exchanger, the refrigerant cannot be accumulated in a large quantity in the plural indoor heat exchangers whose total volume is small, so the refrigerant circuit cannot be charged with the prescribed quantity of the refrigerant determined by the cooling operation, and, as a result, there is the concern that this will lead to an insufficient charge in the cooling operation.

It is a problem of the present invention to make possible, in an air conditioning apparatus equipped with a refrigerant circuit that is configured as a result of an outdoor unit having an outdoor heat exchanger and plural indoor units having indoor heat exchangers being interconnected via a liquid refrigerant communication pipe and a gas refrigerant communication pipe, a refrigerant charging operation that does not excessively lower the indoor temperatures and can appropriately charge the refrigerant circuit with the prescribed quantity of the refrigerant even in a case where the outdoor temperature is low.

An air conditioning apparatus pertaining to a first aspect is configured as a result of an outdoor unit having an outdoor heat exchanger and plural indoor units having indoor heat exchangers being interconnected via a liquid refrigerant communication pipe and a gas refrigerant communication pipe, and the air conditioning apparatus has a refrigerant circuit and a control component. The refrigerant circuit is switchable to a cooling cycle state, which causes the outdoor heat exchanger to function as a radiator of refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant. The control component controls devices configuring the outdoor unit and the plural indoor units. Additionally, here, when charging the refrigerant circuit with the refrigerant in a case where the total volume of the plural indoor heat exchangers is smaller than the volume of the outdoor heat exchanger, the control component starts a heating refrigerant charging operation that is performed by switching the refrigerant circuit to the heating cycle state, performs the heating refrigerant charging operation until a predetermined heating refrigerant charging completion condition is met, thereafter switches to a cooling refrigerant charging operation that is performed by switching the refrigerant circuit to the cooling cycle state, and performs the cooling refrigerant charging operation until a refrigerant charging completion condition where the refrigerant circuit is charged with a prescribed quantity of the refrigerant is met.

Here, in a case where the total volume of the plural indoor heat exchangers is smaller than the volume of the outdoor heat exchanger, the control component first performs the heating refrigerant charging operation until the heating refrigerant charging completion condition is met, so a lowering of the indoor temperatures can be avoided in comparison to a case where just the cooling refrigerant charging operation is performed. Moreover, here, after the heating refrigerant charging completion condition has been met, the control component switches to the cooling refrigerant charging operation and performs the cooling refrigerant charging operation until the refrigerant charging completion condition where the refrigerant circuit is charged with the prescribed quantity of the refrigerant is met, so the refrigerant circuit can be reliably charged with the prescribed quantity of the refrigerant determined by the cooling operation.

An air conditioning apparatus pertaining to a second aspect is the air conditioning apparatus pertaining to the first aspect, wherein when charging the refrigerant circuit with the refrigerant in a case where the total volume of the plural indoor heat exchangers is equal to or greater than the volume of the outdoor heat exchanger, the control component performs the heating refrigerant charging operation until the refrigerant charging completion condition is met.

Here, in a case where the total volume of the plural indoor heat exchangers is equal to or greater than the volume of the outdoor heat exchanger when charging the refrigerant circuit with the refrigerant, the control component performs the heating refrigerant charging operation until the refrigerant charging completion condition where the refrigerant circuit is charged with the prescribed quantity of the refrigerant is met, so the refrigerant circuit can be reliably charged with the prescribed quantity of the refrigerant determined by the heating operation. Moreover, here, a lowering of the indoor temperatures can be avoided in comparison to a case where the cooling refrigerant charging operation is performed.

In this way, in the air conditioning apparatus pertaining to the first and second aspects, as described above, by performing a combination of the heating refrigerant charging operation and the cooling refrigerant charging operation in accordance with the magnitude relation between the total volume of the plural indoor heat exchangers and the volume of the outdoor heat exchanger, a refrigerant charging operation that does not excessively lower the indoor temperatures and can appropriately charge the refrigerant circuit with the prescribed quantity of the refrigerant even in a case where the outdoor temperature is low can be made possible.

An air conditioning apparatus pertaining to a third aspect is the air conditioning apparatus pertaining to the first or second aspect, wherein the control component regards the heating refrigerant charging completion condition as being met in a case where it can determine that the section of the refrigerant circuit leading from the liquid-side end of any of the plural indoor heat exchangers via the liquid refrigerant communication pipe to the outdoor unit is filled with the refrigerant in a liquid state.

Here, reaching the heating refrigerant charging completion condition after the start of the heating refrigerant charging operation means that in the heating operation the refrigerant has accumulated in the indoor heat exchangers and the refrigerant has also accumulated in the liquid refrigerant communication pipe. For this reason, here, a state can be created in which it suffices to charge the refrigerant circuit with the refrigerant needed for the heating operation by performing the heating refrigerant charging operation until the heating refrigerant charging completion condition is met, and then, with the cooling refrigerant charging operation thereafter, to charge the refrigerant circuit with the remaining quantity of the refrigerant until reaching the prescribed quantity determined by the cooling operation.

Because of this, here, by employing the above-described heating refrigerant charging completion condition, the refrigerant circuit can be charged with the prescribed quantity of the refrigerant determined by the cooling operation by using the heating refrigerant charging operation to charge the refrigerant circuit with a large quantity of the refrigerant and thereafter using the cooling refrigerant charging operation to charge the refrigerant circuit with a small quantity of the refrigerant, and the operating time of the cooling refrigerant charging operation performed after the heating refrigerant charging operation can be shortened to further keep the indoor temperatures from becoming lower.

An air conditioning apparatus pertaining to a fourth aspect is the air conditioning apparatus pertaining to the first or second aspect, wherein the control component regards the heating refrigerant charging completion condition as being met in a case where the degree of subcooling of the refrigerant in any of the plural indoor heat exchangers has become equal to or greater than a predetermined threshold degree of subcooling.

The degrees of subcooling of the refrigerant in the indoor heat exchangers become larger when the refrigerant accumulates in the indoor heat exchangers, so whether or not the refrigerant has accumulated in the indoor heat exchangers can be detected. Thus, here, as described above, the control component determines, based on whether or not the degree of subcooling of the refrigerant in any of the indoor heat exchangers has become equal to or greater than the threshold degree of subcooling, whether or not the heating refrigerant charging completion condition is met.

Because of this, here, whether or not the refrigerant has accumulated in the indoor heat exchangers can be reliably determined by employing the above-described heating refrigerant charging completion condition.

An air conditioning apparatus pertaining to a fifth aspect is the air conditioning apparatus pertaining to any of the first, second and fourth aspects, wherein the control component regards the heating refrigerant charging completion condition as being met in a case where the temperature difference between the temperature of the refrigerant in any of the plural indoor heat exchangers and the temperature of the refrigerant flowing through the liquid refrigerant communication pipe has become equal to or less than a predetermined threshold liquid temperature difference.

When the refrigerant accumulates in the liquid refrigerant communication pipe, the temperature of the refrigerant in the section of the liquid refrigerant communication pipe near the outdoor unit becomes closer to the temperature of the refrigerant in the section of the liquid refrigerant communication pipe near the indoor units, so whether or not the refrigerant has accumulated in the liquid refrigerant communication pipe can be detected. Thus, here, as described above, the control component determines, based on whether or not the temperature difference between the temperature of the refrigerant in any of the plural indoor heat exchangers and the temperature of the refrigerant flowing through the liquid refrigerant communication pipe has become equal to or less than the threshold liquid temperature difference, whether or not the heating refrigerant charging completion condition is met.

Because of this, here, whether or not the refrigerant has accumulated in the liquid refrigerant communication pipe can be reliably determined by employing the above-described heating refrigerant charging completion condition.

An air conditioning apparatus pertaining to a sixth aspect is the air conditioning apparatus pertaining to any of the first, second, fourth and fifth aspects, wherein the plural indoor units each have, on the liquid-side end of the indoor heat exchanger, an indoor expansion valve that adjusts the flow rate of the refrigerant flowing through the indoor heat exchanger. Additionally, the control component regards the heating refrigerant charging completion condition as being met in a case where the opening degree of any of the plural indoor expansion valves has become equal to or greater than a predetermined threshold valve opening degree.

When the refrigerant accumulates in the indoor heat exchangers, the degrees of subcooling of the refrigerant in the indoor heat exchangers become larger. At this time, for example, as the control component controls the opening degrees of the indoor expansion valves in such a way as to bring the degrees of subcooling of the refrigerant in the indoor heat exchangers closer to the target degrees of subcooling, the opening degrees of the indoor expansion valves become larger as the degrees of subcooling of the refrigerant in the indoor heat exchangers become larger, so whether or not the refrigerant has accumulated in the indoor heat exchangers can be detected. Thus, here, as described above, the control component determines, based on whether or not the opening degree of any of the plural indoor expansion valves has become equal to or greater than the predetermined threshold valve opening degree, whether or not the heating refrigerant charging completion condition is met.

Because of this, here, whether or not the refrigerant has accumulated in the indoor heat exchangers can be reliably determined by employing the above-described heating refrigerant charging completion condition.

An air conditioning apparatus pertaining to a seventh aspect is the air conditioning apparatus pertaining to any of the first to sixth aspects, wherein the control component obtains the total volume of the plural indoor heat exchangers on the basis of volume data of the indoor heat exchangers of the plural indoor units connected to the outdoor unit.

Here, for example, the control component performs the determination of whether the total volume of the plural indoor heat exchangers is equal to or greater than the volume of the outdoor heat exchanger or smaller than the volume of the outdoor heat exchanger by obtaining information relating to the volumes of the indoor heat exchangers and the volume of the outdoor heat exchanger through, for example, communication with the plural indoor units and the outdoor unit, obtaining from this information the total volume of the plural indoor heat exchangers and the volume of the outdoor heat exchanger, and comparing both volumes. At this time, the information relating to the volumes of the indoor heat exchangers and the volume of the outdoor heat exchanger may be the volume data itself or may be model information about the plural indoor units and the outdoor unit. It should be noted that in a case where the information relating to the volumes of the indoor heat exchangers and the volume of the outdoor heat exchanger is model information, volume data of heat exchangers by model may be stored in advance in the control component, and the control component may read and use the volume data corresponding to the model information when performing the determination of whether the total volume of the plural indoor heat exchangers is equal to or greater than the volume of the outdoor heat exchanger or smaller than the volume of the outdoor heat exchanger.

In this way, here, as described above, by obtaining the total volume of the plural indoor heat exchangers on the basis of the volume data of the indoor heat exchangers of the plural indoor units connected to the outdoor unit, the control component can appropriately perform the determination of whether the total volume of the plural indoor heat exchangers is equal to or greater than the volume of the outdoor heat exchanger or smaller than the volume of the outdoor heat exchanger.

DESCRIPTION OF EMBODIMENT

An embodiment of an air conditioning apparatus pertaining to the invention will be described below on the basis of the drawings. It should be noted that the specific configurations of the embodiment of the air conditioning apparatus pertaining to the invention are not limited to those in the following embodiment and its example modifications and can be changed to the extent that they do not depart from the spirit of the invention.

(1) CONFIGURATION OF AIR CONDITIONING APPARATUS

Figure 1:
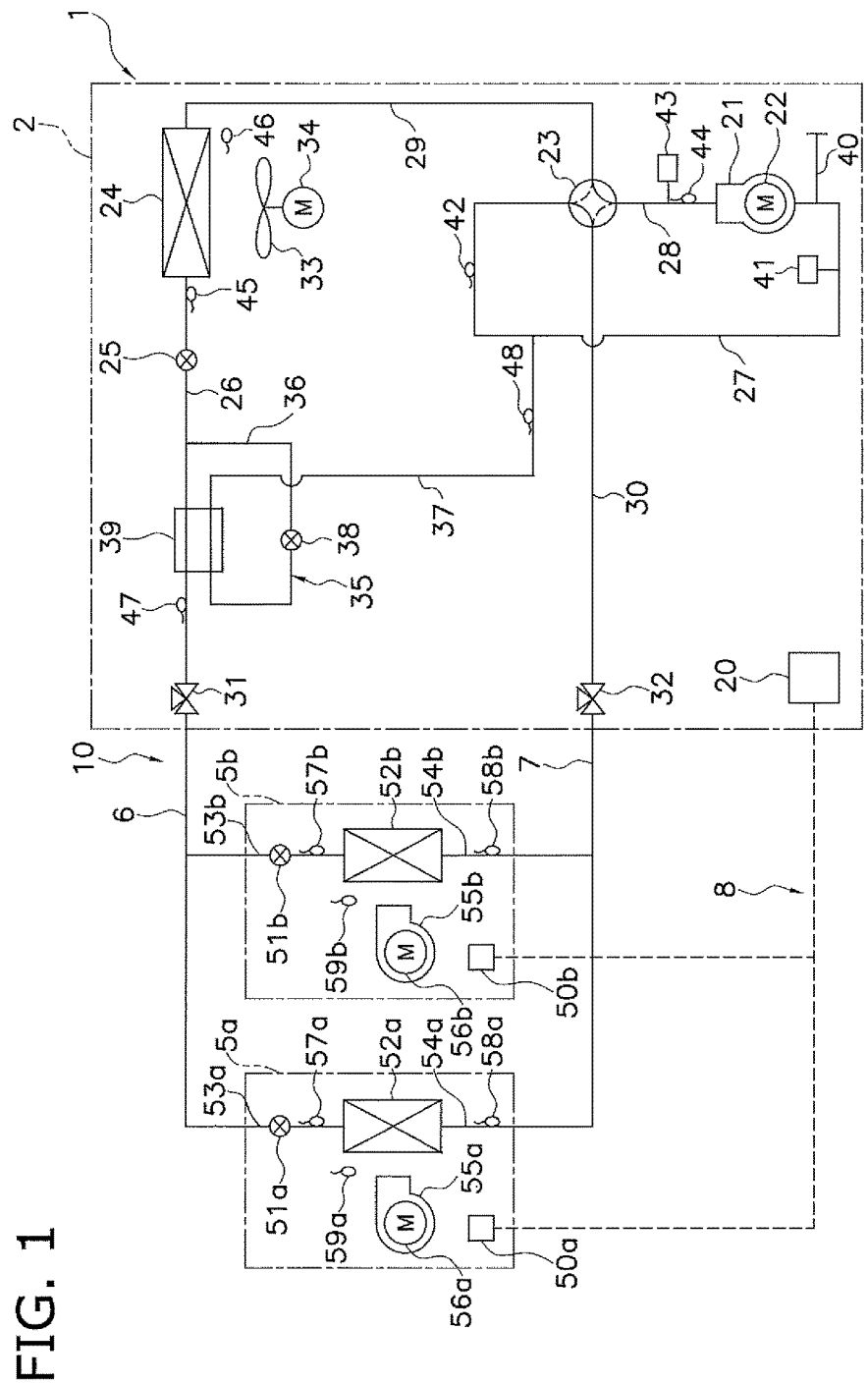
FIG. 1 is general configuration diagram of an air conditioning apparatus pertaining to an embodiment of the invention.

FIG. 1 is a general configuration diagram of an air conditioning apparatus 1 pertaining to the embodiment of the invention. The air conditioning apparatus 1 is an apparatus that uses a vapor compression refrigeration cycle to perform cooling and heating of rooms in a building, for example. The air conditioning apparatus 1 mainly has an outdoor unit 2, plural (here, two) indoor units 5a and 5b connected to each other in parallel, and a liquid refrigerant communication pipe 6 and a gas refrigerant communication pipe 7 that interconnect the outdoor unit 2 and the indoor units 5a and 5b. Additionally, a vapor compression refrigerant circuit 10 of the air conditioning apparatus 1 is configured as a result of the outdoor unit 2 and the plural indoor units 5a and 5b being interconnected via the liquid refrigerant communication pipe 6 and the gas refrigerant communication pipe 7.

<Indoor Units>

The indoor units 5a and 5b are installed in rooms of a building, for example. The indoor units 5a and 5b are connected to the outdoor unit 2 via the liquid refrigerant communication pipe 6 and the gas refrigerant communication pipe 7 as described above and configure part of the refrigerant circuit 10.

Next, the configuration of the indoor units 5a and 5b will be described. It should be noted that because the indoor unit 5a and the indoor unit 5b have the same configuration, just the configuration of the indoor unit 5a will be described here. and regarding the configuration of the indoor unit 5b, the suffix "b" will be assigned instead of the suffix "a" denoting parts of the indoor unit 5a, and description of the parts of the indoor unit 5b will be omitted.

The indoor unit 5a mainly has an indoor expansion valve 51a and an indoor heat exchanger 52a. Furthermore, the indoor unit 5a has an indoor liquid refrigerant pipe 53a, which interconnects the liquid-side end of the indoor heat exchanger 52a and the liquid refrigerant communication pipe 6, and an indoor gas refrigerant pipe 54a, which interconnects the gas-side end of the indoor heat exchanger 52a and the gas refrigerant communication pipe 7.

The indoor expansion valve 51a is an electric expansion valve capable of opening degree adjustment that performs, for example, adjustment of the flow rate of the refrigerant flowing through the indoor heat exchanger 52a, and the indoor expansion valve 51a is provided in the indoor liquid refrigerant pipe 53a.

The indoor heat exchanger 52a is a heat exchanger for performing heat exchange between the refrigerant and the indoor air. The liquid-side end of the indoor heat exchanger 52a is connected to the indoor liquid refrigerant pipe 53a, and the gas-side end of the indoor heat exchanger 52a is connected to the indoor gas refrigerant pipe 54a. Here, the indoor unit 5a has an indoor fan 55a for sucking the indoor air into the indoor unit 5a, causing the indoor air to exchange heat with the refrigerant in the indoor heat exchanger 52a, and thereafter supplying the air as supply air to the room. That is, the indoor unit 5a has the indoor fan 55a as a fan that supplies to the indoor heat exchanger 52a the indoor air serving as a heating source or a cooling source for the refrigerant flowing through the indoor heat exchanger 52a. The indoor fan 55a is driven by an indoor fan motor 56a.

The indoor unit 5a is provided with various sensors. Specifically, the indoor unit 5a is provided with an indoor heat exchanger liquid-side sensor 57a that detects a temperature Trla of the refrigerant at the liquid-side end of the indoor heat exchanger 52a, an indoor heat exchanger gas-side sensor 58a that detects a temperature Trga of the refrigerant at the gas-side end of the indoor heat exchanger 52a, and an indoor air sensor 59a that detects a temperature Traa of the indoor air sucked into the indoor unit 5a.

The indoor unit 5a has an indoor-side control component 50a that controls the actions of the parts configuring the indoor unit 5a. Additionally, the indoor-side control component 50a has a microcomputer and a memory provided in order to perform control of the indoor unit 5a and can exchange control signals and so forth with the outdoor unit 2 via a communication line. Here, in a case where a remote controller (not shown in the drawings) for individually operating the indoor unit 5a is provided, the remote controller is also included in the indoor-side control component 50a.

<Outdoor Unit>

The outdoor unit 2 is installed outside the building, for example. The outdoor unit 2 is connected to the indoor units 5a and 5b via the liquid refrigerant communication pipe 6 and the gas refrigerant communication pipe 7 as described above and configures part of the refrigerant circuit 10.

Next, the configuration of the outdoor unit 2 will be described.

The outdoor unit 2 mainly has a compressor 21, a switching mechanism 23, an outdoor heat exchanger 24, and an outdoor expansion valve 25. Furthermore, the outdoor unit 2 has an outdoor liquid refrigerant pipe 26 that interconnects the liquid-side end of the outdoor heat exchanger 24 and the liquid refrigerant communication pipe 6, a suction pipe 27 that interconnects the switching mechanism 23 and the suction side of the compressor 21, a discharge pipe 28 that interconnects the discharge side of the compressor 21 and the switching mechanism 23, a first outdoor gas refrigerant pipe 29 that interconnects the switching mechanism 23 and the gas-side end of the outdoor heat exchanger 24, and a second outdoor gas refrigerant pipe 30 that interconnects the gas refrigerant communication pipe 7 and the switching mechanism 23. A liquid-side stop valve 31 is provided where the outdoor liquid refrigerant pipe 26 and the liquid refrigerant communication pipe 6 connect to each other, and a gas-side stop valve 32 is provided where the second outdoor gas refrigerant pipe 30 and the gas refrigerant communication pipe 7 connect to each other. The liquid-side stop valve 31 and the gas-side stop valve 32 are valves that are manually opened and closed.

The compressor 21 is a device that compresses low-pressure refrigerant to a high pressure. Here, as the compressor 21, a compressor with a closed structure where a rotary-type or scroll-type positive displacement compression element (not shown in the drawings) is driven to rotate by a compressor motor 22 is used. Furthermore, here, the rotational speed of the compressor motor 22 is controllable by an inverter or the like, so that the capacity of the compressor 21 is controllable.

The switching mechanism 23 is a four-port switching valve that can switch the flow direction of the refrigerant in the refrigerant circuit 10. Here, in the cooling operation, the switching mechanism 23 is a mechanism capable of switching that causes the suction side of the compressor 21 to communicate with the gas refrigerant communication pipe 7 through the suction pipe 27 and the second outdoor gas refrigerant pipe 30 and causes the discharge side of the compressor 21 to communicate with the gas-side end of the outdoor heat exchanger 24 through the discharge pipe 28 and the first outdoor gas refrigerant pipe 29. That is, because of this switching of the switching mechanism 23, the refrigerant circuit 10 is switchable to a cooling cycle state (see the solid lines of the switching mechanism 23 in FIG. 1) that causes the outdoor heat exchanger 24 to function as a radiator of the refrigerant and causes the indoor heat exchangers 52a and 52b to function as evaporators of the refrigerant. Furthermore, in the heating operation, the switching mechanism 23 is a mechanism capable of switching that causes the suction side of the compressor 21 to communicate with the gas-side end of the outdoor heat exchanger 24 through the suction pipe 27 and the first outdoor gas refrigerant pipe 29 and causes the discharge side of the compressor 21 to communicate with the gas refrigerant communication pipe 7 through the discharge pipe 28 and the second outdoor gas refrigerant pipe 30. That is, because of this switching of the switching mechanism 23, the refrigerant circuit 10 is switchable to a heating cycle state (see the dashed lines of the switching mechanism 23 in FIG. 1) that causes the outdoor heat exchanger 24 to function as an evaporator of the refrigerant and causes the indoor heat exchangers 52a and 52b to function as radiators of the refrigerant. It should be noted that the switching mechanism 23 is not limited to a four-port switching valve and may also be configured in such a way that it can, through a combination of plural electromagnetic valves and refrigerant pipes, perform the switching of the flow direction of the refrigerant described above.

The outdoor heat exchanger 24 is a device for performing heat exchange between the refrigerant and the outdoor air. The liquid-side end of the outdoor heat exchanger 24 is connected to the outdoor liquid refrigerant pipe 26, and the gas-side end of the outdoor heat exchanger 24 is connected to the first outdoor gas refrigerant pipe 29. Here, the outdoor unit 2 has an outdoor fan 33 for sucking the outdoor air into the outdoor unit 2, causing the outdoor air to exchange heat with the refrigerant in the outdoor heat exchanger 24, and exhausting the air to the outside of the unit. That is, the outdoor unit 2 has the outdoor fan 33 as a fan that supplies to the outdoor heat exchanger 24 the outdoor air serving as a cooling source or a heating source for the refrigerant flowing through the outdoor heat exchanger 24. The outdoor fan 33 is driven by an outdoor fan motor 34.

The outdoor expansion valve 25 is an electric expansion valve capable of opening degree adjustment that performs, for example, adjustment of the flow rate of the refrigerant flowing through the outdoor heat exchanger 24, and the outdoor expansion valve 25 is provided in the outdoor liquid refrigerant pipe 26.

Furthermore, a refrigerant return pipe 35 is connected to, and a refrigerant cooler 39 is provided in, the outdoor liquid refrigerant pipe 26. The refrigerant return pipe 35 is a refrigerant pipe that diverts some of the refrigerant flowing through the outdoor liquid refrigerant pipe 26 and returns the diverted refrigerant to the compressor 21. The refrigerant cooler 39 is a heat exchanger that uses the refrigerant flowing through the refrigerant return pipe 35 to cool the refrigerant flowing through the outdoor liquid refrigerant pipe 26; here, the refrigerant cooler 39 is provided in the section of the outdoor liquid refrigerant pipe 26 on the liquid refrigerant communication pipe 6 side of the outdoor expansion valve 25.

The refrigerant return pipe 35 here is a refrigerant pipe that sends to the suction side of the compressor 21 the refrigerant diverted from the outdoor liquid refrigerant pipe 26. Additionally, the refrigerant return pipe 35 mainly has a refrigerant return inlet pipe 36 and a refrigerant return outlet pipe 37. The refrigerant return inlet pipe 36 is a refrigerant pipe that diverts some of the refrigerant flowing through the outdoor liquid refrigerant pipe 26 and sends the diverted refrigerant to an inlet on the refrigerant return pipe 35 side of the refrigerant cooler 39; here, the refrigerant return inlet pipe 36 is connected to the section of the outdoor liquid refrigerant pipe 26 between the outdoor expansion valve 25 and the refrigerant cooler 39. A refrigerant return expansion valve 38 that performs, for example, adjustment of the flow rate of the refrigerant flowing through the refrigerant return pipe 35 is provided in the refrigerant return inlet pipe 36. Here, the refrigerant return expansion valve 38 is an electric expansion valve. The refrigerant return outlet pipe 37 is a refrigerant pipe that sends the diverted refrigerant from an outlet on the refrigerant return pipe 35 side of the refrigerant cooler 39 to the suction pipe 27 connected to the suction side of the compressor 21. Additionally, the refrigerant cooler 39 uses low-pressure refrigerant flowing through the refrigerant return pipe 35 to cool the refrigerant flowing through the outdoor liquid refrigerant pipe 26. It should be noted that the refrigerant return pipe 35 may also be a refrigerant pipe that sends the refrigerant to the middle of the compression process of the compressor 21 rather than to the suction side of the compressor 21. In this case, the refrigerant cooler 39 uses intermediate-pressure refrigerant flowing through the refrigerant return pipe 35 to cool the refrigerant flowing through the outdoor liquid refrigerant pipe 26.

Furthermore, the refrigerant circuit 10 is provided with a service nozzle 40 for connecting a refrigerant tank, for example, when charging the refrigerant circuit 10 with the refrigerant. Here, the service nozzle 40 is connected to the suction pipe 27. It should be noted that the position where the service nozzle 40 is provided is not limited to the suction pipe 27 and may also be another position in the refrigerant circuit 10. Furthermore, in a case where the stop valves 31 and 32 have service ports, the service ports of the stop valves 31 and 32 may be used as the service nozzle 40.

The outdoor unit 2 is provided with various sensors. Specifically, provided in the vicinity of the compressor 21 of the outdoor unit 2 are a suction pressure sensor 41 that detects a suction pressure Ps of the compressor 21, a suction temperature sensor 42 that detects a suction temperature Ts of the compressor 21, a discharge pressure sensor 43 that detects a discharge pressure Pd of the compressor 21, and a discharge temperature sensor 44 that detects a discharge temperature Td of the compressor 21. Furthermore, provided in the section of the outdoor liquid refrigerant pipe 26 on the outdoor heat exchanger 24 side of the refrigerant cooler 39 (here, the section on the outdoor heat exchanger 24 side of the outdoor expansion valve 25) is an outdoor heat exchanger liquid-side sensor 45 that detects a temperature Tol of the refrigerant at the liquid-side end of the outdoor heat exchanger 24. Furthermore, provided in the vicinity of the outdoor heat exchanger 24 or the outdoor fan 33 is an outdoor air sensor 46 that detects a temperature Toa of the outdoor air sucked into the outdoor unit 2. Furthermore, provided in the section of the outdoor liquid refrigerant pipe 26 between the refrigerant cooler 39 and the liquid-side stop valve 31 is a liquid pipe-side sensor 47 that detects a temperature Tip of the refrigerant sent from the refrigerant cooler 39 to the liquid refrigerant communication pipe 6 or the refrigerant sent from the liquid refrigerant communication pipe 6 to the refrigerant cooler 39. Moreover, provided in the refrigerant return outlet pipe 37 is a refrigerant return-side sensor 48 that detects a temperature Tor of the refrigerant flowing through the outlet on the refrigerant return pipe 35 side of the refrigerant cooler 39.

The outdoor unit 2 has an outdoor-side control component 20 that controls the actions of the parts configuring the outdoor unit 2. Additionally, the outdoor-side control component 20 has a microcomputer and a memory provided in order to perform control of the outdoor unit 2 and can exchange controls signals and so forth via a communication line with the indoor-side control components 50a and 50b of the indoor units 5a and 5b.

<Refrigerant Communication Pipes>

The refrigerant communication pipes 6 and 7 are refrigerant pipes constructed on site when installing the air conditioning apparatus 1 in an installation location such as a building, and pipes having various lengths and pipe diameters are used in accordance with installation conditions such as the installation location and the combination of the outdoor unit 2 and the indoor units 5a and 5b.

<Control Component>

Figure 2:
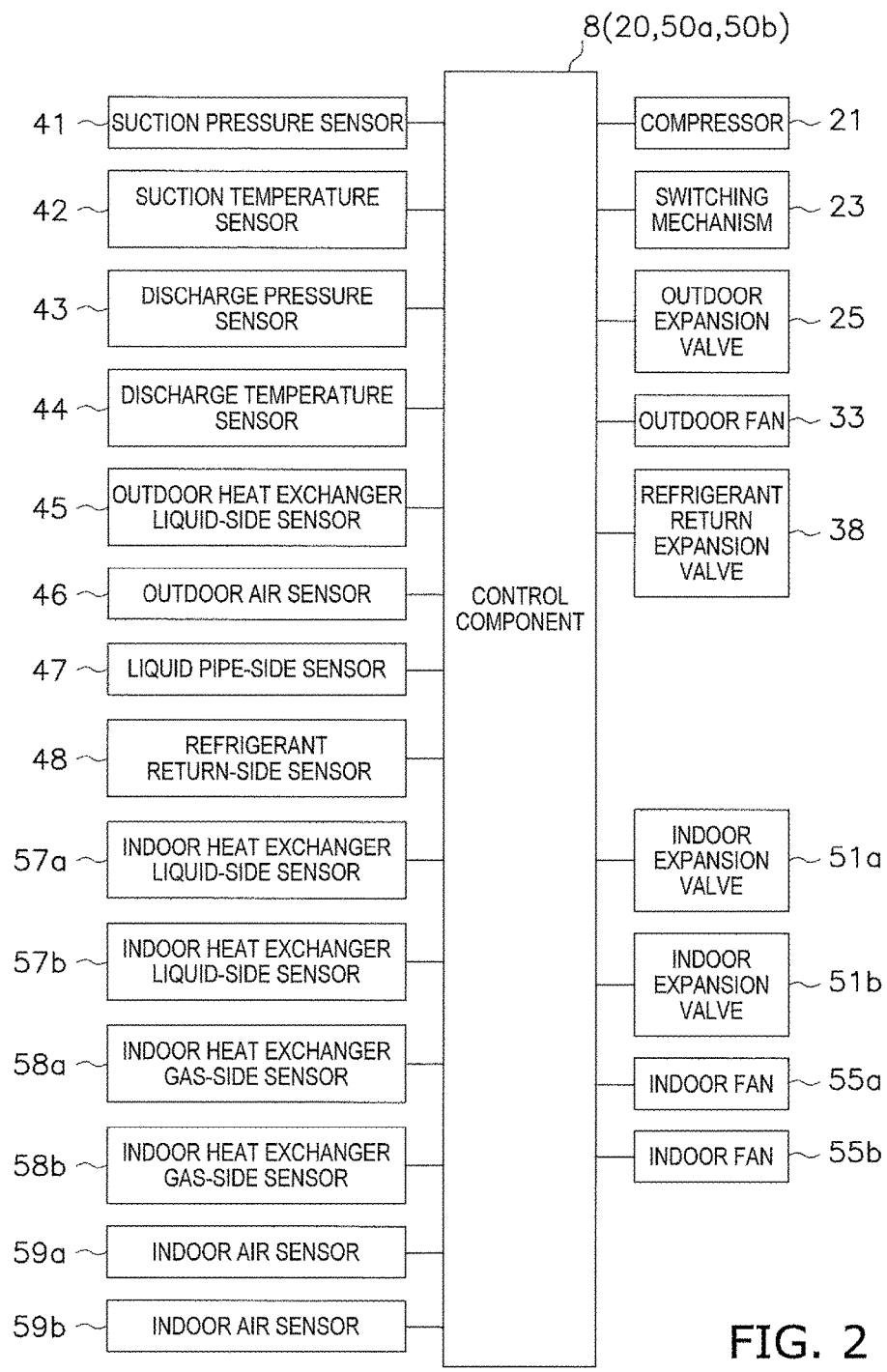
FIG. 2 is a control block diagram of the air conditioning apparatus.

The indoor-side control components 50a and 50b of the indoor units 5a and 5b and the outdoor-side control component 20 of the outdoor unit 2 are communicably interconnected via a communication line or the like to configure a control component 8 that performs operation control of the entire air conditioning apparatus 1. As shown in FIG. 2, the control component 8 is connected in such a way that it can receive detection signals of the various sensors 41 to 48, 57a to 59a, and 57b to 59b and is connected in such a way that it can control the various devices 21, 23, 25, 33, 38, 51a, 55a, 51b, and 55b on the basis of these detection signals. Here, FIG. 2 is a control block diagram of the air conditioning apparatus 1.

As described above, the air conditioning apparatus 1 is configured as a result of the outdoor unit 2 having the outdoor heat exchanger 24 and the plural indoor units 5a and 5b having the indoor heat exchangers 52a and 52b being interconnected via the liquid refrigerant communication pipe 6 and the gas refrigerant communication pipe 7, and the air conditioning apparatus 1 has the refrigerant circuit 10 and the control component 8. The refrigerant circuit 10 is switchable to the cooling cycle state, which causes the outdoor heat exchanger 24 to function as a radiator of the refrigerant and causes the indoor heat exchangers 52a and 52b to function as evaporators of the refrigerant, and the heating cycle state, which causes the outdoor heat exchanger 24 to function as an evaporator of the refrigerant and causes the indoor heat exchangers 52a and 52b to function as radiators of the refrigerant. The control component 8 controls the devices configuring the outdoor unit 2 and the plural indoor units 5a and 5b.

(2) ACTIONS OF AIR CONDITIONING APPARATUS IN NORMAL OPERATING MODE

Next, the actions (normal operating mode) of the air conditioning apparatus 1 when performing control of the devices configuring the outdoor unit 2 and the indoor units 5a and 5b in accordance with the operating loads of the plural indoor units 5a and 5b will be described.

The normal operating mode mainly includes the cooling operation that performs cooling of the rooms and the heating operation that performs heating of the rooms. The control of the devices configuring the outdoor unit 2 and the plural indoor units 5a and 5b in the normal operating mode described below is performed by the control component 8.
<Cooling Operation>

The cooling operation in the normal operating mode will be described using FIG. 1 and FIG. 2.

When an instruction for the cooling operation is given by input from a remote controller (not shown in the drawings) or the like, by the control component 8, the switching mechanism 23 switches in such a way that the refrigerant circuit 10 switches to the cooling cycle state (the state indicated by the solid lines of the switching mechanism 23 in FIG. 1), the compressor 21, the outdoor fan 33, and the indoor fans 55a and 55b start up, and the expansion valves 25, 38, 51a, and 51b, among other devices, perform predetermined actions.

When this happens, the low-pressure gas refrigerant in the refrigerant circuit 10 is sucked into the compressor 21, compressed, and becomes high-pressure gas refrigerant. The high-pressure gas refrigerant is sent through the switching mechanism 23 to the outdoor heat exchanger 24.

The high-pressure gas refrigerant that has been sent to the outdoor heat exchanger 24 exchanges heat with the outdoor air supplied by the outdoor fan 33, is cooled, and thereby condenses to become high-pressure liquid refrigerant in the outdoor heat exchanger 24 functioning as a radiator of the refrigerant. The high-pressure liquid refrigerant is sent through the outdoor expansion valve 25 to the refrigerant cooler 39.

The high-pressure liquid refrigerant that has been sent to the refrigerant cooler 39 exchanges heat with the refrigerant flowing through the refrigerant return pipe 35, is further cooled, and is sent through the liquid-side stop valve 31 and the liquid refrigerant communication pipe 6 from the outdoor unit 2 to the indoor units 5a and 5b. At this time, some of the high-pressure liquid refrigerant flowing through the outdoor liquid refrigerant pipe 26 is diverted to the refrigerant return pipe 35 and is reduced in pressure by the refrigerant return expansion valve 38. Additionally, the refrigerant that has been reduced in pressure by the refrigerant return expansion valve 38 is sent to the refrigerant cooler 39, exchanges heat with the high-pressure liquid refrigerant flowing through the outdoor liquid refrigerant pipe 26, is heated, thereby evaporates to become gas refrigerant, and is returned to the compressor 21.

The high-pressure liquid refrigerant that has been sent to the indoor units 5a and 5b is reduced in pressure by the indoor expansion valves 51a and 51b to become low-pressure refrigerant in a gas-liquid two-phase state. The low-pressure refrigerant in the gas-liquid two-phase state is sent to the indoor heat exchangers 52a and 52b.

The low-pressure refrigerant in the gas-liquid two-phase state that has been sent to the indoor heat exchangers 52a and 52b exchanges heat with the indoor air supplied by the indoor fans 55a and 55b, is heated, and thereby evaporates to become low-pressure gas refrigerant in the indoor heat exchangers 52a and 52b functioning as evaporators of the refrigerant. The low-pressure gas refrigerant is sent through the gas refrigerant communication pipe 7 from the indoor units 5a and 5b to the outdoor unit 2.

The low-pressure gas refrigerant that has been sent to the outdoor unit 2 is sucked through the gas-side stop valve 32 and the switching mechanism 23 back into the compressor 21.
<Heating Operation>

The heating operation in the normal operating mode will be described using FIG. 1 and FIG. 2.

When an instruction for the heating operation is given by input from a remote controller (not shown in the drawings) or the like, by the controller 8, the switching mechanism 23 switches in such a way that the refrigerant circuit 10 switches to the heating cycle state (the state indicated by the dashed lines of the switching mechanism 23 in FIG. 1), the compressor 21, the outdoor fan 33, and the indoor fans 55a and 55b start up, and the expansion valves 25, 38, 51a, and 51b, among other devices, perform predetermined actions.

When this happens, the low-pressure gas refrigerant in the refrigerant circuit 10 is sucked into the compressor 21, compressed, and becomes high-pressure gas refrigerant. The high-pressure gas refrigerant is sent through the switching mechanism 23, the gas-side stop valve 32 and the gas refrigerant communication pipe 7 from the outdoor unit 2 to the indoor units 5a and 5b.

The high-pressure gas refrigerant that has been sent to the indoor units 5a and 5b is sent to the indoor heat exchangers 52a and 52b.

The high-pressure gas refrigerant that has been sent to the indoor heat exchangers 52a and 52b exchanges heat with the indoor air supplied by the indoor fans 55a and 55b, is cooled, and thereby condenses to become high-pressure liquid refrigerant in the indoor heat exchangers 52a and 52b functioning as radiators of the refrigerant. The high-pressure liquid refrigerant is sent through the indoor expansion valves 51a and 51b and the liquid refrigerant communication pipe 6 from the indoor units 5a and 5b to the outdoor unit 2.

The refrigerant that has been sent to the outdoor unit 2 is sent through the liquid-side stop valve 31 and the refrigerant cooler 39 to the outdoor expansion valve 25, is reduced in pressure by the outdoor expansion valve 25, and becomes low-pressure refrigerant in a gas-liquid two-phase state. The low-pressure refrigerant in the gas-liquid two-phase state is sent to the outdoor heat exchanger 24.

The low-pressure refrigerant in the gas-liquid two-phase state that has been sent to the outdoor heat exchanger 24 exchanges heat with the outdoor air supplied by the outdoor fan 33, is heated, and thereby evaporates to become low-pressure gas refrigerant in the outdoor heat exchanger 24 functioning as an evaporator of the refrigerant. The low-pressure gas refrigerant is sucked through the switching mechanism 23 back into the compressor 21.

(3) ACTIONS IN REFRIGERANT CHARGING OPERATION MODE OF AIR CONDITIONING APPARATUS

Figure 3:
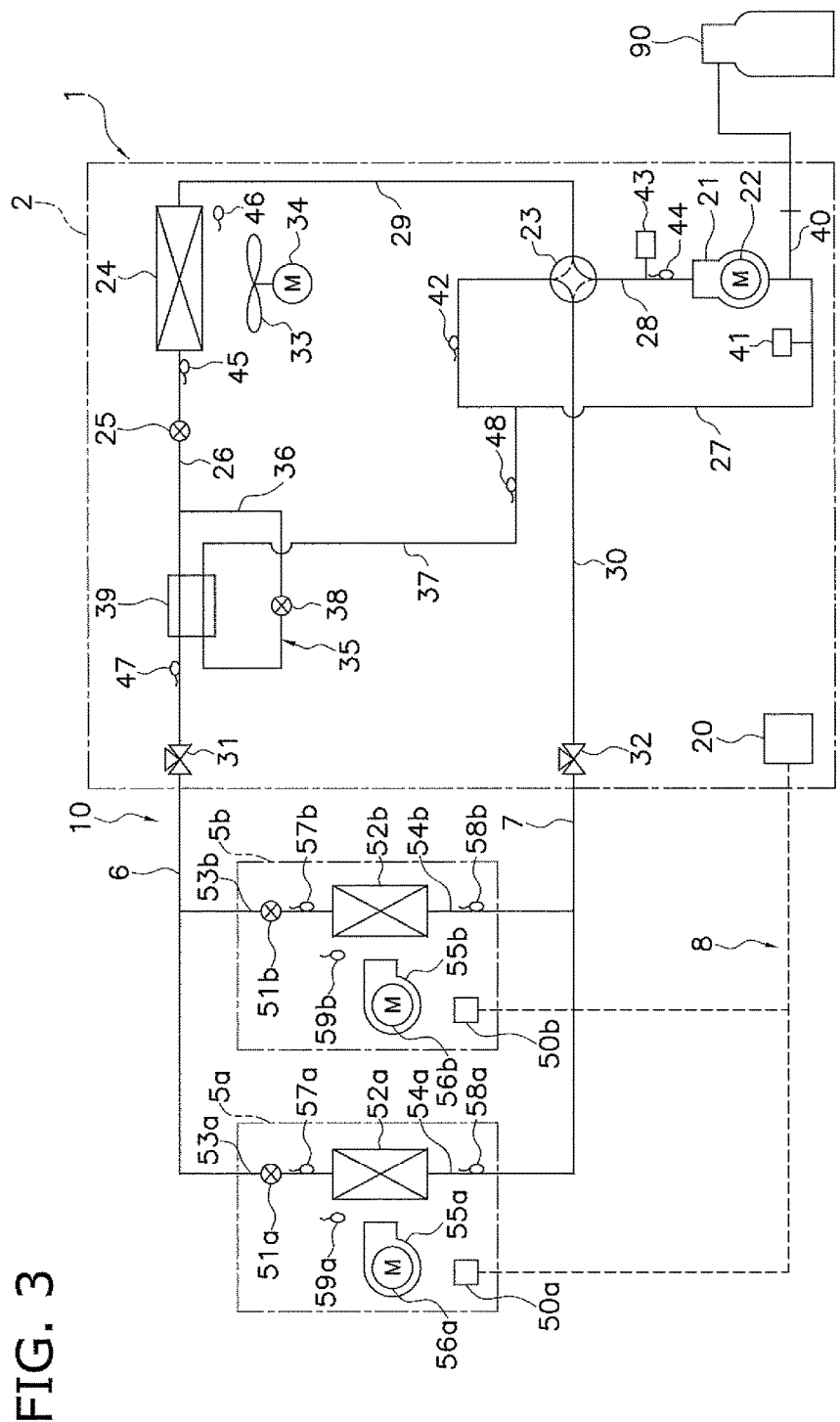
FIG. 3 is a general configuration diagram of the air conditioning apparatus when charging a refrigerant circuit with refrigerant.

Next, the actions (refrigerant charging operation mode) of the air conditioning apparatus 1 when charging the refrigerant circuit 10 with a prescribed quantity of the refrigerant after installation and/or after maintenance of the air conditioning apparatus 1 will be described. Here, as shown in FIG. 3, a case where a refrigerant tank 90 is connected to the service port 40 of the refrigerant circuit 10 and the refrigerant circuit 10 is charged with the refrigerant until reaching a prescribed quantity will be taken as an example and described. It should be noted that, although it is not employed here, in a case where the outdoor unit 2 has a refrigerant storage tank (not shown in the drawings), the refrigerant circuit 10 may also be charged with the refrigerant from the refrigerant storage tank.

In the refrigerant charging operation mode, two refrigerant charging operations (a first refrigerant charging operation and a second refrigerant charging operation) are prepared so as to be able to handle a case where the outdoor air temperature is low and one wants to avoid lowering the indoor temperatures. Additionally, in the refrigerant charging operation mode, which of the first refrigerant charging operation and the second refrigerant charging operation is to be performed is selected based on whether or not the total volume of the plural indoor heat exchangers 52a and 52b is equal to or greater than the volume of the outdoor heat exchanger 24. Control of the devices configuring the outdoor unit 2 and the plural indoor units 5a and 5b in the two refrigerant charging operations described below, and a process (heat exchanger volume determination process) which precedes that control and determines whether or not the total volume of the plural indoor heat exchangers 52a and 52b is equal to or greater than the volume of the outdoor heat exchanger 24, are performed by the control component 8.

<Heat Exchanger Volume Determination Process>

The heat exchanger volume determination process in the refrigerant charging operation mode will be described using FIG. 3 and FIG. 4.

First, prior to the refrigerant charging operation, charging of the refrigerant circuit 10 with the refrigerant is enabled by, for example, connecting the refrigerant tank 90 to the refrigerant circuit 10 through the service nozzle 40. Here, in a case where the refrigerant circuit 10 is configured using the outdoor unit 2 charged with refrigerant beforehand, the refrigerant circuit 10 is filled with this refrigerant in advance. Furthermore, in a case where the outdoor unit 2 is not charged with refrigerant beforehand, the refrigerant circuit 10 is filled in advance with refrigerant from the refrigerant tank 90, for example, to an extent that device damage or the like does not occur when performing the refrigerant charging operation.

Figure 4:
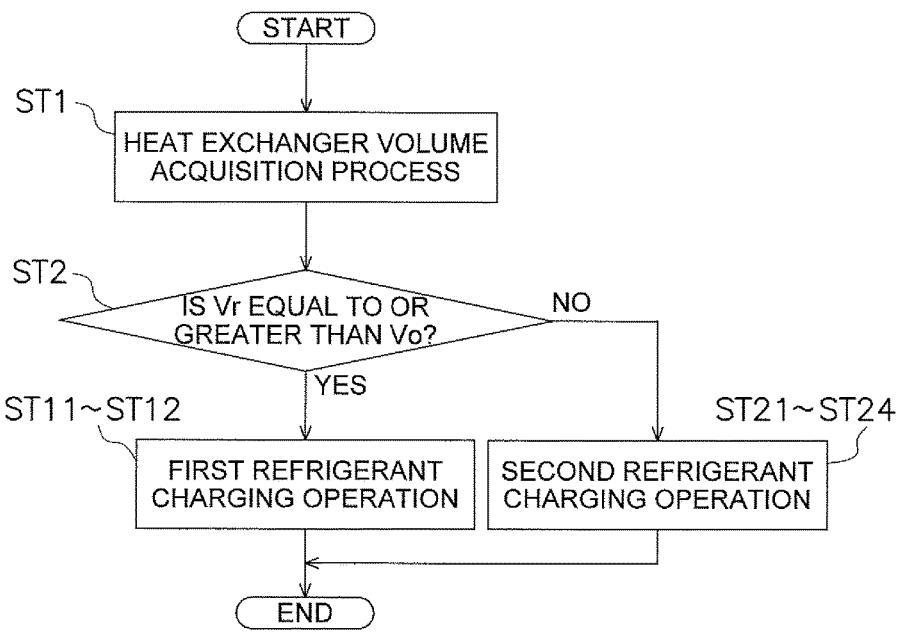
FIG. 4 is a flowchart of a refrigerant charging operation mode including a heat exchanger volume determination process.

Next, when an instruction for the refrigerant charging operation is given by input from a remote controller (not shown in the drawings) or the like, first, the process (heat exchanger volume determination process) of steps ST1 and ST2 shown in FIG. 4 is performed by the control component 8 prior to the first refrigerant charging operation of steps ST11 and ST12 or the second refrigerant charging operation of steps ST21 to ST24 shown in FIG. 4.

-Step ST1-

In step ST1, the control component 8 obtains information relating to volumes Vra and Vrb of the indoor heat exchangers 52a and 52b and a volume Vo of the outdoor heat exchanger 24 through, for example, communication with the plural indoor units 5a and 5b and the outdoor unit 2, and obtains from this information a total volume Vr of the plural indoor heat exchangers 52a and 52b and the volume Vo of the outdoor heat exchanger 24 (heat exchanger volume acquisition process). At this time, the information relating to the volumes Vra and Vrb of the indoor heat exchangers 52a and 52b and the volume Vo of the outdoor heat exchanger 24 may be volume data itself or may be model information (model and capacity) of the plural indoor units 5a and 5b and the outdoor unit 2. It should be noted that in a case where the information relating to the volumes Vra and Vrb of the indoor heat exchangers 52a and 52b and the volume Vo of the outdoor heat exchanger 24 is model information, volume data of heat exchangers by model may be stored in advance in the control component 8, and the control component 8 may read the volume data corresponding to the model information to obtain the total volume Vr of the plural indoor heat exchangers 52a and 52b and the volume Vo of the outdoor heat exchanger 24. Furthermore, the timing when the control component 8 obtains the information relating to the volumes Vra and Vrb of the indoor heat exchangers 52a and 52b and the volume Vo of the outdoor heat exchanger 24 may be in the process of step ST1 or when communication is established between the plural indoor units 5a and 5b and the outdoor unit 2 after installation and/or after maintenance of the air conditioning apparatus 1. Furthermore, although here there is just one outdoor heat exchanger 24 because an example is given where there is one outdoor unit 2, in a case where there are plural outdoor units 2, the control component 8 may obtain the total volume of the plural outdoor heat exchangers in the same way as the indoor heat exchangers.

-Step ST2-

Next, in step ST2, the control component 8 performs a determination of whether or not the total volume Vr of the plural indoor heat exchangers 52a and 52b is equal to or greater than the volume Vo of the outdoor heat exchanger 24 by comparing the total volume Vr of the plural indoor heat exchangers 52a and 52b and the volume Vo of the outdoor heat exchanger 24 that were obtained by the heat exchanger volume acquisition process of step ST1.

Additionally, in the determination of step ST2, in a case where the total volume Vr of the plural indoor heat exchangers 52a and 52b is equal to or greater than the volume Vo of the outdoor heat exchanger 24, the control component 8 moves to the first refrigerant charging operation of steps ST11 and ST12, and in a case where this is not so, that is, in a case where the total volume Vr of the plural indoor heat exchangers 52a and 52b is smaller than the volume Vo of the outdoor heat exchanger 24, the control component 8 moves to the second refrigerant charging operation of steps ST21 to ST24.

<First Refrigerant Charging Operation>

Figure 5:
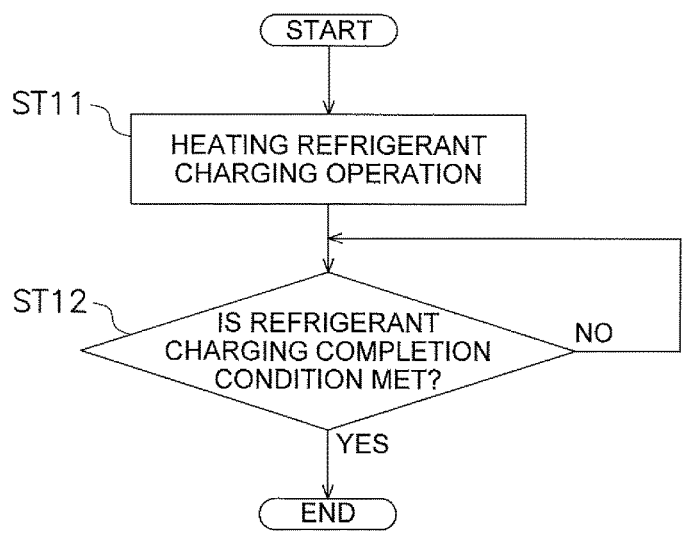
FIG. 5 is a flowchart of a first refrigerant charging operation.

When the first refrigerant charging operation is selected by the heat exchanger volume determination process of steps ST1 and ST2, the control component 8 performs the first refrigerant charging operation of steps ST11 and ST12 shown in FIG. 4 and FIG. 5.

-Step ST11-

In the first refrigerant charging operation, a heating refrigerant charging operation that controls constituent devices including the compressor 21 in such a way that the refrigerant in the refrigerant circuit 10 reaches a predetermined circulation state is performed in step ST11.

Here, the predetermined circulation state in the heating refrigerant charging operation is a state in which the switching mechanism 23 switches in such a way that the refrigerant circuit 10 switches to the heating cycle state (the state indicated by the dashed lines of the switching mechanism 23 in FIG. 3) and all the indoor units 5a and 5b are controlled to forcibly perform the heating operation (hereafter called "all-indoor-units heating"). Because of this, in the compressor 21, low-pressure gas refrigerant flows while being compressed to a high pressure. In the section of the refrigerant circuit 10 leading from the discharge side of the compressor 21 through the discharge pipe 28, the switching mechanism 23, the second outdoor gas refrigerant pipe 30, the gas-side stop valve 32, the gas refrigerant communication pipe 7, and the indoor gas refrigerant pipes 54a and 54b to the gas-side ends of the indoor heat exchangers 52a and 52b, high-pressure gas refrigerant flows. In the indoor heat exchangers 52a and 52b, high-pressure refrigerant flows while undergoing a phase change from a gas state to a liquid state because of heat exchange with the indoor air. In the section of the refrigerant circuit 10 leading from the liquid-side ends of the indoor heat exchangers 52a and 52b through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25, high-pressure liquid refrigerant flows. In the section of the refrigerant circuit 10 leading from the outdoor expansion valve 25 to the liquid-side end of the outdoor heat exchanger 24, low-pressure refrigerant in a gas-liquid two-phase state flows. In the outdoor heat exchanger 24, low-pressure refrigerant flows while undergoing a phase change from the gas-liquid two-phase state to a gas state because of heat exchange with the outdoor air. In the section of the refrigerant circuit 10 leading from the gas-side end of the outdoor heat exchanger 24 through the first outdoor gas refrigerant pipe 29, the switching mechanism 23, and the suction pipe 27 to the suction side of the compressor 21, low-pressure gas refrigerant flows. In this way, in the first refrigerant charging operation, the control component 8 performs the heating refrigerant charging operation that performs heating of the rooms in order to avoid lowering the indoor temperatures.

Moreover, here, the control component 8 controls (hereinafter called "high pressure control") the operating capacity of the compressor 21 (here, the rotational speed of the compressor motor 22) in such a way that a high pressure Pc (condensation temperature Tc) in the refrigerant circuit 10 becomes constant at a target high pressure Pcs (target condensation temperature Tcs). Here, as the high pressure Pc (condensation temperature Tc) in the refrigerant circuit 10, the discharge pressure Pd (a value obtained by converting the discharge pressure Pd into the saturation temperature of the refrigerant) of the compressor 21 detected by the discharge pressure sensor 43 can be used. This stabilizes a low pressure Pe (evaporation temperature Te) and the high pressure Pc (condensation temperature Tc) in the refrigerant circuit 10.

Furthermore, here, the control component 8 controls (hereinafter called "outdoor degree of superheat control") the opening degree of the outdoor expansion valve 25 in such a way that a degree of superheat SHo of the refrigerant in the outdoor heat exchanger 24 functioning as an evaporator of the refrigerant becomes constant at a target degree of superheat SHos. Here, as the degree of superheat SHo of the refrigerant in the outdoor heat exchanger 24, a temperature difference obtained by subtracting the evaporation temperature Te in the refrigerant circuit 10 from the suction temperature Ts detected by the suction temperature sensor 42 can be used. As the evaporation temperature Te in the refrigerant circuit 10, a value obtained by converting the suction pressure Ps of the compressor 21 detected by the suction pressure sensor 41 to the saturation temperature of the refrigerant can be used. Because of this, low-pressure gas refrigerant reliably flows in the section of the refrigerant circuit 10 leading from the gas-side end of the outdoor heat exchanger 24 through the first outdoor gas refrigerant pipe 29, the switching mechanism 23, and the suction pipe 27 to the suction side of the compressor 21. Furthermore, this stabilizes the quantity of the refrigerant accumulating in the outdoor heat exchanger 24 functioning as an evaporator of the refrigerant.

Moreover, here, the control component 8 controls (hereinafter called "indoor degree of subcooling control") the opening degrees of the indoor expansion valves 51a and 51b in such a way that degrees of subcooling SCra and SCrb of the refrigerant in the indoor heat exchangers 52a and 52b functioning as radiators of the refrigerant become constant at target degrees of subcooling SCras and SCrbs. Here, as the degrees of subcooling SCra and SCrb of the refrigerant in the indoor heat exchangers 52a and 52b, temperature differences obtained by subtracting temperatures Trla and Trlb of the refrigerant at the liquid-side ends of the indoor heat exchangers 52a and 52b detected by the indoor heat exchanger liquid-side sensors 57a and 57b from the condensation temperature Tc in the refrigerant circuit 10 can be used. As the condensation temperature Tc in the refrigerant circuit 10, a value obtained by converting the discharge pressure Pd of the compressor 21 detected by the discharge pressure sensor 43 to the saturation temperature of the refrigerant can be used. Because of this, high-pressure liquid refrigerant flows in the section of the refrigerant circuit 10 leading from the indoor heat exchangers 52a and 52b through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25.

The state of the refrigerant circulating in the refrigerant circuit 10 becomes stable because of this heating refrigerant charging operation, so when the refrigerant circuit 10 is charged with refrigerant, a state is created where the refrigerant gradually accumulates mainly in the section of the refrigerant circuit 10 leading from the indoor heat exchangers 52a and 52b functioning as radiators of the refrigerant through the indoor liquid refrigerant pipes 53a and 53b, the indoor expansion valves 51a and 51b, the liquid refrigerant communication pipe 6, the outdoor liquid refrigerant pipe 26, the liquid-side stop valve 31, and the refrigerant cooler 39 to the outdoor expansion valve 25.

-Step ST12-

When the refrigerant circuit 10 is being charged with the refrigerant while the heating refrigerant charging operation of step ST11 is being performed, the quantity of the refrigerant in the refrigerant circuit 10 gradually increases, and the refrigerant accumulates in the indoor heat exchangers 52a and 52b functioning as radiators of the refrigerant and in the liquid refrigerant communication pipe 6 on the downstream side thereof and so forth. Additionally, when the refrigerant circuit 10 becomes charged with the prescribed quantity of the refrigerant, the degrees of subcooling SCra and SCrb (or state quantities equivalent to the degrees of subcooling SCra and SCrb) of the refrigerant in the indoor heat exchangers 52a and 52b functioning as radiators of the refrigerant reach a refrigerant charging completion prescribed value Qt signifying that the refrigerant circuit 10 is charged with the prescribed quantity of the refrigerant.

Here, in order to charge the refrigerant circuit 10 with the prescribed quantity of the refrigerant, it is necessary to accumulate a large quantity of the refrigerant in the indoor heat exchangers 52a and 52b functioning as radiators of the refrigerant. For this reason, in order to charge the refrigerant circuit 10 with the prescribed quantity of the refrigerant using the heating refrigerant charging operation, it is necessary to accumulate the refrigerant in a large quantity in the plural indoor heat exchangers 52a and 52b functioning as radiators of the refrigerant. Additionally, in the refrigerant circuit 10 that is switchable between the cooling operation and the heating operation, the prescribed quantity of the refrigerant is determined by the magnitudes of the volume Vo of the outdoor heat exchanger 24 that functions as a radiator of the refrigerant in the cooling operation and the total volume Vr of the plural indoor heat exchangers 52a and 52b that function as radiators of the refrigerant in the heating operation. That is, in a case where the volume Vo of the outdoor heat exchanger 24 is large, the prescribed quantity of the refrigerant is determined by the cooling operation, and in a case where the total volume Vr of the plural indoor heat exchangers 52a and 52b is large, the prescribed quantity of the refrigerant is determined by the heating operation.

For this reason, in step ST12, when the refrigerant circuit 10 is being charged with the refrigerant while the heating refrigerant charging operation of step ST11 is being performed, the control component 8 utilizes changes in the degrees of subcooling SCra and SCrb (or state quantities equivalent to the degrees of subcooling SCra and SCrb) of the refrigerant in the indoor heat exchangers 52a and 52b functioning as radiators of the refrigerant to determine whether or not a refrigerant charging completion condition signifying that the refrigerant circuit 10 has become charged with the prescribed quantity of the refrigerant is met. Because of this, when the quantity of the refrigerant with which the refrigerant circuit 10 has been charged has not reached the prescribed quantity, it is determined in step ST12 that the degrees of subcooling SCra and SCrb (or state quantities equivalent to the degrees of subcooling SCra and SCrb) of the refrigerant in the indoor heat exchangers 52a and 52b functioning as radiators of the refrigerant have not reached the refrigerant charging completion prescribed value Qt, that is, that the refrigerant charging completion condition is not met, and so the process of step ST12 becomes repeated. Here, it is judged that the refrigerant charging completion condition is not met in a case where a mean value SCrv of the degrees of subcooling SCra and SCrb (or state quantities equivalent to the degrees of subcooling SCra and SCrb) of the refrigerant in the indoor heat exchangers 52a and 52b functioning as radiators of the refrigerant has not reached a threshold degree of subcooling SCrvt serving as the refrigerant charging completion prescribed value Qt. Then, after it has been determined in step ST12 that the degrees of subcooling SCra and SCrb (or state quantities equivalent to the degrees of subcooling SCra and SCrb) of the refrigerant in the indoor heat exchangers 52a and 52b functioning as radiators of the refrigerant have reached the refrigerant charging completion prescribed value Qt (here, the mean value SCrv of the degrees of subcooling SCra and SCrb has reached the threshold degree of subcooling SCrvt serving as the refrigerant charging completion prescribed value Qt), that is, that the refrigerant charging completion condition is met, the control component 8 ends the charging of the refrigerant circuit 10 with the refrigerant from the refrigerant tank 90 or the like.

It should be noted that it is possible to use, as the state quantities equivalent to the degrees of subcooling SCra and Serb and the refrigerant charging completion prescribed value Qt, state quantities that change in accompaniment with changes in the degrees of subcooling SCra and Scrb; for example, the control component 8 may calculate the quantity of the refrigerant in the refrigerant circuit 10 including the plural indoor heat exchangers 52a and 52b on the basis of the degrees of subcooling SCra and Scrb during the heating refrigerant charging operation or other state quantities such as temperatures and pressures, use these as the state quantities equivalent to the degrees of subcooling SCra and Scrb, and use the prescribed quantity of the refrigerant as the refrigerant charging completion prescribed value Qt.

<Second Refrigerant Charging Operation>

Figure 6:
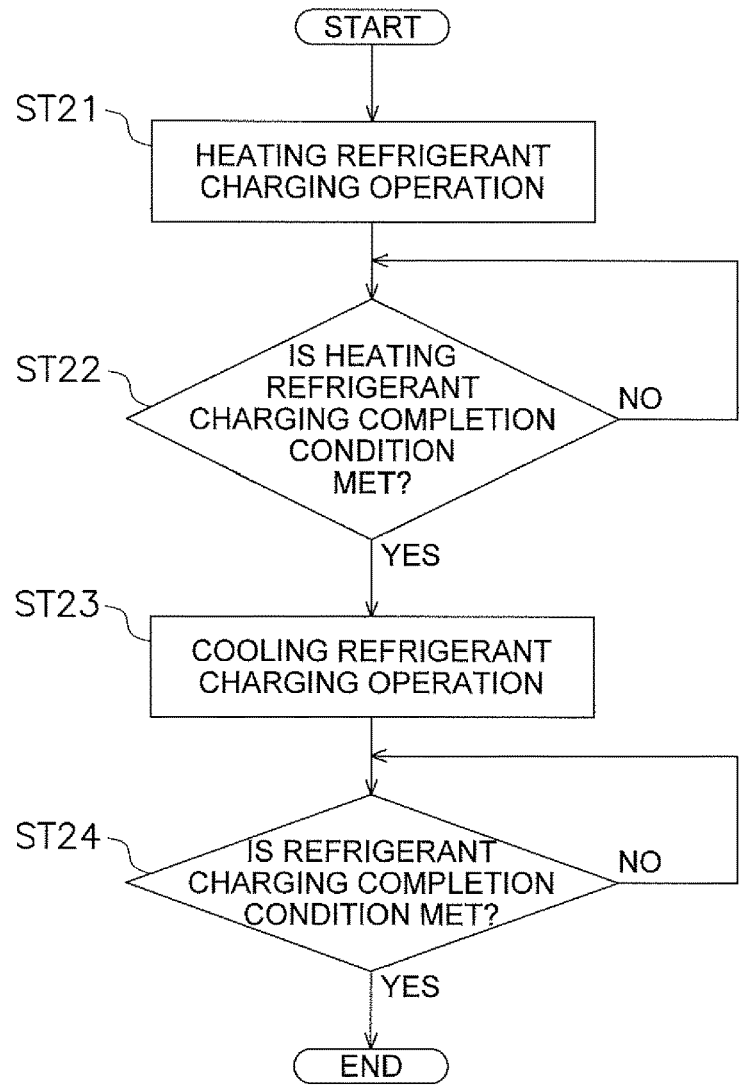
FIG. 6 is a flowchart of a second refrigerant charging operation.

When the second refrigerant charging operation is selected by the heat exchanger volume determination process of steps ST1 and ST2, the control component 8 performs the second refrigerant charging operation of steps ST21 to ST24 shown in FIG. 4 and FIG. 6.

-Step ST21-

In the second refrigerant charging operation, a heating refrigerant charging operation that controls constituent devices including the compressor 21 in such a way that the refrigerant in the refrigerant circuit 10 reaches a predetermined circulation state is first performed in step ST21. The specific content of the heating refrigerant charging operation is the same as that of the heating refrigerant charging operation of step ST11, so description will be omitted here. In this way, in the second refrigerant charging operation, as in the first refrigerant charging operation, in order to avoid lowering the indoor temperatures, the control component 8 first performs a heating refrigerant charging operation that performs heating of the rooms, rather than a cooling refrigerant charging operation that performs cooling of the rooms.

-Step ST22-

When the refrigerant circuit 10 is being charged with the refrigerant while the heating refrigerant charging operation of step ST21 is being performed, the quantity of the refrigerant in the refrigerant circuit 10 gradually increases, and the refrigerant accumulates in the indoor heat exchangers 52a and 52b functioning as radiators of the refrigerant and in the liquid refrigerant communication pipe 6 on the downstream side thereof and so forth.

At this time, it is conceivable to perform the heating refrigerant charging operation until the refrigerant circuit 10 becomes charged with the prescribed quantity of the refrigerant as in the first refrigerant charging operation. However, the total volume Vr of the plural indoor heat exchangers 52a and 52b changes depending on the number and type (model) of the indoor units 5a and 5b connected to the outdoor unit 2. For this reason, even if one tries to charge the refrigerant circuit 10 with the refrigerant in the heating refrigerant charging operation as in the first refrigerant charging operation, in a case where the total volume Vr of the plural indoor heat exchangers 52a and 52b is smaller than the volume Vo of the outdoor heat exchanger 24, the refrigerant cannot be accumulated in a large quantity in the plural indoor heat exchangers 52a and 52b whose total volume Vr is small, so the refrigerant circuit 10 cannot be charged with the prescribed quantity of the refrigerant determined by the cooling operation, and, as a result, there is the concern that this will lead to an insufficient charge in the cooling operation.

For this reason, in step ST22, in order to prevent an insufficient charge in the cooling operation, when the refrigerant circuit 10 is being charged with the refrigerant while the heating refrigerant charging operation of step ST21 is being performed, the control component 8 determines whether or not a heating refrigerant charging completion condition signifying that the refrigerant circuit 10 has been charged with the refrigerant needed for the heating operation is met. That is, the control component 8 determines that the heating refrigerant charging completion condition is met in a case where the section of the refrigerant circuit 10 leading from the liquid-side end of any of the plural indoor heat exchangers 52a and 52b via the liquid refrigerant communication pipe 6 to the outdoor unit 2 is filled with refrigerant in a liquid state. Additionally, here, utilizing the fact that the degrees of subcooling SCra and SCrb of the refrigerant in the indoor heat exchangers 52a and 52b become larger when the refrigerant accumulates in the indoor heat exchangers 52a and 52b functioning as radiators of the refrigerant, the control component 8 determines that the heating refrigerant charging completion condition is met in a case where the degree of subcooling SCra or SCrb of the refrigerant in any of the plural indoor heat exchangers 52a and 52b has become equal to or greater than a predetermined threshold degree of subcooling SCrat or SCrbt. Because of this, it is determined in step ST22 that the heating refrigerant charging completion condition is not met in a case where the degree of subcooling SCra or SCrb of the refrigerant in any of the plural indoor heat exchangers 52a and 52b functioning as radiators of the refrigerant has not reached the threshold degree of subcooling SCrat or SCrbt, and so the process of step ST22 becomes repeated. Then, after it has been determined in step ST22 that the degree of subcooling SCra or SCrb of the refrigerant in any of the plural indoor heat exchangers 52a and 52b functioning as radiators of the refrigerant has reached the threshold degree of subcooling SCrat or SCrbt, that is, that the heating refrigerant charging completion condition is met, the control component 8 ends the heating refrigerant charging operation.

-Step ST23-

After the control component 8 performs the heating refrigerant charging operation of step ST21 until the heating refrigerant charging completion condition of step ST22 is met, next, in step ST23, the control component 8 is switched to a cooling refrigerant charging operation that controls constituent devices including the compressor 21 in such a way that the refrigerant in the refrigerant circuit 10 reaches a predetermined circulation state. Here, the predetermined circulation state in the cooling refrigerant charging operation is a state in which the switching mechanism 23 switches in such a way that the refrigerant circuit 10 switches to the cooling cycle state (the state indicated by the solid lines of the switching mechanism 23 in FIG. 3) and all the indoor units 5a and 5b are controlled to forcibly perform the cooling operation (hereinafter called "all-indoor-units cooling"). Because of this, in the compressor 21, low-pressure gas refrigerant flows while being compressed. In the section of the refrigerant circuit 10 leading from the discharge side of the compressor 21 through the discharge pipe 28, the switching mechanism 23, and the first outdoor gas refrigerant pipe 29 to the gas-side end of the outdoor heat exchanger 24, high-pressure gas refrigerant flows. In the outdoor heat exchanger 24, high-pressure refrigerant flows while undergoing a phase change from a gas state to a liquid state because of heat exchange with the outdoor air. In the section of the refrigerant circuit 10 leading from the liquid-side end of the outdoor heat exchanger 24 through the outdoor liquid refrigerant pipe 26, the outdoor expansion valve 25, the refrigerant cooler 39, the liquid-side stop valve 31, the liquid refrigerant communication pipe 6, and the indoor liquid refrigerant pipes 53a and 53b to the indoor expansion valves 51a and 51b, high-pressure liquid refrigerant flows. In the section of the refrigerant circuit 10 leading from the indoor expansion valves 51a and 51b through the indoor liquid refrigerant pipes 53a and 53b to the liquid-side ends of the indoor heat exchangers 52a and 52b, low-pressure refrigerant in a gas-liquid two-phase state flows. In the indoor heat exchangers 52a and 52b, low-pressure refrigerant flows while undergoing a phase change from a gas-liquid two-phase state to a gas state because of heat exchange with the indoor air. In the section of the refrigerant circuit 10 leading from the gas-side ends of the indoor heat exchangers 52a and 52b through the indoor gas refrigerant pipes 54a and 54b, the gas refrigerant communication pipe 7, the second outdoor gas refrigerant pipe 30, the gas-side stop valve 32, the switching mechanism 23, and the suction pipe 27 to the suction side of the compressor 21, low-pressure gas refrigerant flows.

Moreover, here, the control component 8 controls (hereinafter called "low pressure control") the operating capacity of the compressor 21 (here, the rotational speed of the compressor motor 22) in such a way that the low pressure Pe (evaporation temperature Te) in the refrigerant circuit 10 becomes a target low pressure Pes (target evaporation temperature Tes). Here, as the low pressure Pe (evaporation temperature Te) in the refrigerant circuit 10, the suction pressure Ps (a value obtained by converting the suction pressure Ps to the saturation temperature of the refrigerant) of the compressor 21 detected by the suction pressure sensor 41 can be used. This stabilizes the low pressure Pe (evaporation temperature Te) and the high pressure Pc (condensation temperature Tc) in the refrigerant circuit 10.

Furthermore, here, the control component 8 controls (hereinafter called "indoor degree of superheat control") the opening degrees of the indoor expansion valves 51a and 51b in such a way that degrees of superheat SHra and SHrb of the refrigerant in the indoor heat exchangers 52a and 52b functioning as evaporators of the refrigerant become constant at target degrees of superheat SHras and SHrbs. Here, as the degrees of superheat SHra and SHrb of the refrigerant in the indoor heat exchangers 52a and 52b, temperature differences obtained by subtracting the evaporation temperature Te in the refrigerant circuit 10 from the temperatures Trga and Trgb of the refrigerant at the gas-side ends of the indoor heat exchangers 52a and 52b detected by the indoor heat exchanger gas-side sensors 58a and 58b can be used. As the evaporation temperature Te in the refrigerant circuit 10, a value obtained by converting the suction pressure Ps of the compressor 21 detected by the suction pressure sensor 41 to the saturation temperature of the refrigerant, or the temperatures Trla and Trlb of the refrigerant at the liquid-side ends of the indoor heat exchangers 52a and 52b detected by the indoor heat exchanger liquid-side sensors 57a and 57b, can be used. Because of this, low-pressure gas refrigerant reliably flows in the section of the refrigerant circuit 10 leading from the gas-side ends of the indoor heat exchangers 52a and 52b through the indoor gas refrigerant pipes 54a and 54b, the gas refrigerant communication pipe 7, the second outdoor gas refrigerant pipe 30, the gas-side stop valve 32, the switching mechanism 23, and the suction pipe 27 to the suction side of the compressor 21. Furthermore, this stabilizes the quantity of the refrigerant accumulating in the indoor heat exchangers 52a and 52b functioning as evaporators of the refrigerant.

Moreover, here, the control component 8 controls (hereinafter called "liquid pipe temperature control") the heat exchange capacity of the refrigerant cooler 39 (here, the opening degree of the refrigerant return expansion valve 38) in such a way that the temperature Tlp of the refrigerant sent from the refrigerant cooler 39 through the liquid refrigerant communication pipe 6 to the indoor expansion valves 51a and 51b becomes constant at a target liquid pipe temperature Tlps. Here, as the temperature Tlp of the refrigerant, the temperature of the refrigerant detected by the liquid pipe-side sensor 47 can be used. Because of this, high-pressure liquid refrigerant flows in the section of the refrigerant circuit 10 leading from the refrigerant cooler 39 through the liquid-side stop valve 31, the liquid refrigerant communication pipe 6, and the indoor liquid refrigerant pipes 53a and 53b to the indoor expansion valves 51a and 51b.

The state of the refrigerant circulating in the refrigerant circuit 10 becomes stable because of this cooling refrigerant charging operation, so the refrigerant circuit 10 that has an insufficient charge at the point in time when the heating refrigerant charging completion condition has been met is further charged with refrigerant, and a state is created where the refrigerant gradually accumulates mainly in the section of the refrigerant circuit 10 leading from the outdoor heat exchanger 24 functioning as a radiator of the refrigerant through the outdoor liquid refrigerant pipe 26, the outdoor expansion valve 25, the refrigerant cooler 39, the liquid-side stop valve 31, the liquid refrigerant communication pipe 6, and the indoor liquid refrigerant pipes 53a and 53b to the indoor expansion valves 51a and 51b.

-Step ST24-

When the refrigerant circuit 10 is being charged with the refrigerant while the cooling refrigerant charging operation of step ST23 is being performed, the quantity of the refrigerant in the refrigerant circuit 10 further increases, and the refrigerant accumulates in the outdoor heat exchanger 24 functioning as a radiator of the refrigerant. Additionally, when the refrigerant circuit 10 becomes charged with the prescribed quantity of the refrigerant determined by the cooling operation, a degree of subcooling SCo (or a state quantity equivalent to the degree of subcooling SCo) of the refrigerant in the outdoor heat exchanger 24 functioning as a radiator of the refrigerant reaches the refrigerant charging completion prescribed value Qt signifying that the refrigerant circuit 10 is charged with the prescribed quantity of the refrigerant.

For this reason, when the refrigerant circuit 10 is being charged with the refrigerant while the cooling refrigerant charging operation of step ST23 is being performed, the control component 8 utilizes the change in the degree of subcooling SCo (or a state quantity equivalent to the degree of subcooling SCo) of the refrigerant in the outdoor heat exchanger 24 functioning as a radiator of the refrigerant to determine in step ST24 whether or not a refrigerant charging completion condition signifying that the refrigerant circuit 10 has been charged with the prescribed quantity of the refrigerant is met. Here, as the degree of subcooling SCo of the refrigerant in the outdoor heat exchanger 24, a temperature difference obtained by subtracting the temperature Tol of the refrigerant at the liquid-side end of the outdoor heat exchanger 24 detected by the outdoor heat exchanger liquid-side sensor 45 from the condensation temperature Tc in the refrigerant circuit 10 can be used. As the condensation temperature Tc in the refrigerant circuit 10, a value obtained by converting the discharge pressure Pd of the compressor 21 detected by the discharge pressure sensor 43 to the saturation temperature of the refrigerant can be used. Because of this, when the quantity of the refrigerant with which the refrigerant circuit 10 has been charged has not reached the prescribed quantity, it is determined in step ST24 that the degree of subcooling SCo (or a state quantity equivalent to the degree of subcooling SCo) of the refrigerant in the outdoor heat exchanger 24 functioning as a radiator of the refrigerant has not reached the refrigerant charging completion prescribed value Qt, that is, that the refrigerant charging completion condition is not met, and so the process of step ST24 becomes repeated. Then, after it has been determined in step ST24 that the degree of subcooling SCo (or a state quantity equivalent to the degree of subcooling SCo) of the refrigerant in the outdoor heat exchanger 24 functioning as a radiator of the refrigerant has reached the refrigerant charging completion prescribed value Qt, that is, that the refrigerant charging completion condition is met, the control component 8 ends the charging of the refrigerant circuit 10 with the refrigerant from the refrigerant tank 90 or the like.

It should be noted that it is possible to use, as the state quantity equivalent to the degree of subcooling SCo and the refrigerant charging completion prescribed value Qt, a state quantity that changes in accompaniment with the change in the degree of subcooling SCo; for example, the control component 8 may calculate the quantity of the refrigerant in the refrigerant circuit 10 on the basis of the degree of subcooling SCo during the cooling refrigerant charging operation or another state quantity such as temperature or pressure, use this as the state quantity equivalent to the degree of subcooling SCo, and use the prescribed quantity of the refrigerant as the refrigerant charging completion prescribed value Qt.

(4) CHARACTERISTICS OF REFRIGERANT CHARGING OPERATION OF AIR CONDITIONING APPARATUS

The refrigerant charging operation of the air conditioning apparatus 1 has the following characteristics.

<A>

Here, in a case where the total volume Vr of the plural indoor heat exchangers 52a and 52b is equal to or greater than the volume Vo of the outdoor heat exchanger 24 when charging the refrigerant circuit 10 with the refrigerant, the control component 8 performs, as in the above-described first refrigerant charging operation, the heating refrigerant charging operation until the refrigerant charging completion condition where the refrigerant circuit 10 is charged with the prescribed quantity of the refrigerant is met. For this reason, the refrigerant circuit 10 can be reliably charged with the prescribed quantity of the refrigerant determined by the heating operation. Moreover, here, a lowering of the indoor temperatures can be avoided in comparison to a case where the cooling refrigerant charging operation is performed.

Furthermore, here, in a case where the total volume Vr of the plural indoor heat exchangers 52a and 52b is smaller than the volume Vo of the outdoor heat exchanger 24, the control component 8 first performs the heating refrigerant charging operation until the heating refrigerant charging completion condition is met, so a lowering of the indoor temperatures can be avoided in comparison to a case where just the cooling refrigerant charging operation is performed. Moreover, here, after the heating refrigerant charging completion condition has been met, the control component 8 switches to the cooling refrigerant charging operation and performs the cooling refrigerant charging operation until the refrigerant charging completion condition where the refrigerant circuit 10 is charged with the prescribed quantity of the refrigerant is met, so the refrigerant circuit 10 can be reliably charged with the prescribed quantity of the refrigerant determined by the cooling operation.

In this way, here, as described above, by performing a combination of the heating refrigerant charging operation and the cooling refrigerant charging operation in accordance with the magnitude relation between the total volume Vr of the plural indoor heat exchangers 52a and 52b and the volume Vo of the outdoor heat exchanger 24, a refrigerant charging operation that does not excessively lower the indoor temperatures and can appropriately charge the refrigerant circuit 10 with the prescribed quantity of the refrigerant even in a case where the outdoor temperature is low can be made possible.

<B>

Here, in the above-described second refrigerant charging operation, the control component 8 regards the heating refrigerant charging completion condition as being met in a case where it can determine that the section of the refrigerant circuit 10 leading from the liquid-side end of any of the plural indoor heat exchangers 52a and 52b via the liquid refrigerant communication pipe 6 to the outdoor unit 2 is filled with the refrigerant in a liquid state (see step ST22). For this reason, reaching the heating refrigerant charging completion condition after the start of the heating refrigerant charging operation means that in the heating operation the refrigerant has accumulated in the indoor heat exchangers 52a and 52b and the refrigerant has also accumulated in the liquid refrigerant communication pipe 6. For this reason, here, a state can be created in which it suffices to charge the refrigerant circuit 10 with the refrigerant needed for the heating operation by performing the heating refrigerant charging operation until the heating refrigerant charging completion condition is met and then, with the cooling refrigerant charging operation thereafter, to charge the refrigerant circuit 10 with the remaining quantity of the refrigerant until reaching the prescribed quantity determined by the cooling operation.

Because of this, here, by employing the above-described heating refrigerant charging completion condition, the refrigerant circuit 10 can be charged with the prescribed quantity of the refrigerant determined by the cooling operation by using the heating refrigerant charging operation to charge the refrigerant circuit 10 with a large quantity of the refrigerant and using the cooling refrigerant charging operation to charge the refrigerant circuit 10 with a small quantity of the refrigerant, and the operating time of the cooling refrigerant charging operation performed after the heating refrigerant charging operation can be shortened to further keep the indoor temperatures from becoming lower.

<C>

In the above-described second refrigerant charging operation, the degrees of subcooling SCra and SCrb of the refrigerant in the indoor heat exchangers 52a and 52b become larger when the refrigerant accumulates in the indoor heat exchangers 52a and 52b, so whether or not the refrigerant has accumulated in the indoor heat exchangers 52a and 52b can be detected. Thus, here, in the above-described second refrigerant charging operation, the control component 8 determines, based on whether or not the degree of subcooling SCra or SCrb of the refrigerant in any of the indoor heat exchangers 52a and 52b has become equal to or greater than the threshold degree of subcooling SCrat or SCrbt, whether or not the heating refrigerant charging completion condition is met.

Because of this, here, whether or not the refrigerant has accumulated in the indoor heat exchangers 52a and 52b can be reliably determined by employing the above-described heating refrigerant charging completion condition.

<D>

In the above-described refrigerant charging operation, by obtaining the total volume Vr of the plural indoor heat exchangers 52a and 52b on the basis of the volume data of the indoor heat exchangers 52a and 52b of the plural indoor units 5a and 5b connected to the outdoor unit 2, the control component 8 can appropriately perform the determination of whether the total volume Vr of the plural indoor heat exchangers 52a and 52b is equal to or greater than the volume Vo of the outdoor heat exchanger 24 or smaller than the volume Vo of the outdoor heat exchanger 24.

(5) EXAMPLE MODIFICATIONS

Example Modification 1

In the above-described embodiment, the control component 8 regards the heating refrigerant charging completion condition of step ST22 in the second refrigerant charging operation as being met in a case where the degree of subcooling SCra or SCrb of the refrigerant in any of the indoor heat exchangers 52a and 52b has become equal to or greater than the threshold degree of subcooling SCrat or SCrbt.

However, the control component 8 is not limited to this and may also regard the heating refrigerant charging completion condition as being met in a case where a temperature difference ΔTlp between the temperature Trla or Trlb of the refrigerant in any of the plural indoor heat exchangers 52a and 52b and the temperature Tlp of the refrigerant flowing through the liquid refrigerant communication pipe 6 has become equal to or less than a predetermined threshold liquid temperature difference ΔTlpt. That is, when the refrigerant accumulates in the liquid refrigerant communication pipe 6, the temperature of the refrigerant in the section of the liquid refrigerant communication pipe 6 near the outdoor unit 2 becomes closer to the temperature of the refrigerant in the section of the liquid refrigerant communication pipe 6 near the indoor units 5a and 5b, so whether or not the refrigerant has accumulated in the liquid refrigerant communication pipe 6 can be detected.

Because of this, here, whether or not the refrigerant has accumulated in the liquid refrigerant communication pipe 6 can be reliably determined by employing the above-described heating refrigerant charging completion condition.

Example Modification 2

In the above-described embodiment, the control component 8 regards the heating refrigerant charging completion condition of step ST22 in the second refrigerant charging operation as being met in a case where the degrees of subcooling SCra and SCrb of the refrigerant in the indoor heat exchangers 52a and 52b have become equal to or greater than the threshold degrees of subcooling SCrat and SCrbt.

However, the control component 8 is not limited to this and may also regard the heating refrigerant charging completion condition as being met in a case where an opening degree MVra or MVrb of any of the plural indoor expansion valves 51a and 51b has become equal to or greater than a predetermined threshold valve opening degree MVrat or MVrbt. That is, when the refrigerant accumulates in the indoor heat exchangers 52a and 52b, the degrees of subcooling SCra and SCrb of the refrigerant in the indoor heat exchangers 52a and 52b become larger. At this time, as the control component 8 controls the opening degrees MVra and MVrb of the indoor expansion valves 51a and 51b in such a way as to bring the degrees of subcooling SCra and SCrb of the refrigerant in the indoor heat exchangers 52a and 52b closer to the target degrees of subcooling SCras and SCrbs as in the above-described embodiment, the opening degrees MVra and MVrb of the indoor expansion valves 51a and 51b become larger as the degrees of subcooling SCra and SCrb of the refrigerant in the indoor heat exchangers 52a and 52b become larger, so whether or not the refrigerant has accumulated in the indoor heat exchangers 52a and 52b can be detected.

Because of this, here, whether or not the refrigerant has accumulated in the indoor heat exchangers 52a and 52b can be reliably determined by employing the above-described heating refrigerant charging completion condition.

Example Modification 3

In above-described embodiment and example modifications 1 and 2, the control component 8 individually employs, as the heating refrigerant charging completion condition of step ST22, the condition using the degrees of subcooling SCra and SCrb of the refrigerant in the indoor heat exchangers 52a and 52b, the condition using the temperature difference ΔTlp between the temperatures of Trla and Trlb of the refrigerant in the indoor heat exchangers 52a and 52b and the temperature Tlp of the refrigerant flowing through the liquid refrigerant communication pipe 6, and the condition using the opening degrees MVra and MVrb of the indoor expansion valves 51a and 51b.

However, the control component 8 is not limited to this and may also appropriately combine these three conditions as the heating refrigerant charging completion condition. For example, the control component 8 can determine that the heating refrigerant charging completion condition is met in a case where any one or two of the three conditions is met.

INDUSTRIAL APPLICABILITY

The present invention is widely applicable to air conditioning apparatuses equipped with a refrigerant circuit that is configured as a result of an outdoor unit having an outdoor heat exchanger and plural indoor units having indoor heat exchangers being interconnected via a liquid refrigerant communication pipe and a gas refrigerant communication pipe.

REFERENCE SIGNS LIST

1 Air Conditioning Apparatus
2 Outdoor Unit
5a, 5b Indoor Units
6 Liquid Refrigerant Communication Pipe
7 Gas Refrigerant Communication Pipe
8 Control Component
10 Refrigerant Circuit
24 Outdoor Heat Exchanger
51a, 51b Indoor Expansion Valves
52a, 52b Indoor Heat Exchangers

CITATION LIST

<Patent Literature>
Patent Document 1: JP-A No. 2011-85390

The invention claimed is:
1. An air conditioning apparatus comprising:
a refrigerant circuit that is configured as a result of an outdoor unit having an outdoor heat exchanger and plural indoor units having indoor heat exchangers being interconnected via a liquid refrigerant communication pipe and a gas refrigerant communication pipe, the refrigerant circuit being switchable to a cooling cycle state, which causes the outdoor heat exchanger to function as a radiator of a refrigerant and causes the indoor heat exchangers to function as evaporators of the refrigerant, and a heating cycle state, which causes the outdoor heat exchanger to function as an evaporator of the refrigerant and causes the indoor heat exchangers to function as radiators of the refrigerant; and
a controller configured to control devices configuring the outdoor unit and the plural indoor units,
wherein when charging the refrigerant circuit with the refrigerant in a case where a total volume of the plural indoor heat exchangers is smaller than a volume of the outdoor heat exchanger, the controller starts a heating refrigerant charging operation that is performed by switching the refrigerant circuit to the heating cycle state, performs the heating refrigerant charging operation until a predetermined heating refrigerant charging completion condition is met, thereafter switches to a cooling refrigerant charging operation that is performed by switching the refrigerant circuit to the cooling cycle state, and performs the cooling refrigerant charging operation until a refrigerant charging completion condition where the refrigerant circuit is charged with a prescribed quantity of the refrigerant is met.

2. The air conditioning apparatus according to claim 1, wherein
when charging the refrigerant circuit with the refrigerant in a case where the total volume of the plural indoor heat exchangers is equal to or greater than the volume of the outdoor heat exchanger, the controller performs the heating refrigerant charging operation until the refrigerant charging completion condition is met.

3. The air conditioning apparatus according to claim 1, wherein
the controller regards the heating refrigerant charging completion condition as being met in a case where the controller determines that a section of the refrigerant circuit leading from a liquid-side end of any of the plural indoor heat exchangers via the liquid refrigerant communication pipe to the outdoor unit is filled with the refrigerant in a liquid state.

4. The air conditioning apparatus according to claim 1, wherein
the controller regards the heating refrigerant charging completion condition as being met in a case where a degree of subcooling of the refrigerant in any of the plural indoor heat exchangers has become equal to or greater than a predetermined threshold degree of subcooling.

5. The air conditioning apparatus according to claim 1, wherein
the controller regards the heating refrigerant charging completion condition as being met in a case where a temperature difference between a temperature of the refrigerant in any of the plural indoor heat exchangers and a temperature of the refrigerant flowing through the liquid refrigerant communication pipe has become equal to or less than a predetermined threshold liquid temperature difference.

6. The air conditioning apparatus according to claim 1, wherein
each of the plural indoor units has, on the liquid-side end of the respective indoor heat exchanger, an indoor expansion valve that adjusts a flow rate of the refrigerant flowing through the respective indoor heat exchanger, and
the controller regards the heating refrigerant charging completion condition as being met in a case where an opening degree of any of the plural indoor expansion valves has become equal to or greater than a predetermined threshold valve opening degree.

7. The air conditioning apparatus according to claim 1, wherein the controller obtains the total volume of the plural indoor heat exchangers on the basis of volume data of the indoor heat exchangers of the plural indoor units connected to the outdoor unit.

8. The air conditioning apparatus according to claim 2, wherein
the controller regards the heating refrigerant charging completion condition as being met in a case where the controller determines that a section of the refrigerant circuit leading from a liquid-side end of any of the plural indoor heat exchangers via the liquid refrigerant communication pipe to the outdoor unit is filled with the refrigerant in a liquid state.

9. The air conditioning apparatus according to claim 2, wherein
the controller regards the heating refrigerant charging completion condition as being met in a case where a degree of subcooling of the refrigerant in any of the plural indoor heat exchangers has become equal to or greater than a predetermined threshold degree of subcooling.

10. The air conditioning apparatus according to claim 2, wherein the controller regards the heating refrigerant charging completion condition as being met in a case where a temperature difference between a temperature of the refrigerant in any of the plural indoor heat exchangers and a temperature of the refrigerant flowing through the liquid refrigerant communication pipe has become equal to or less than a predetermined threshold liquid temperature difference.

11. The air conditioning apparatus according to claim 4, wherein the controller regards the heating refrigerant charging completion condition as being met in a case where, in addition to the degree of subcooling of the refrigerant in any of the plural indoor heat exchangers becoming equal to or greater than the predetermined threshold degree of subcooling, a temperature difference between a temperature of the refrigerant in any of the plural indoor heat exchangers and a temperature of the refrigerant flowing through the liquid refrigerant communication pipe has become equal to or less than a predetermined threshold liquid temperature difference.

12. The air conditioning apparatus according to claim 2, wherein
each of the plural indoor units has, on the liquid-side end of the respective indoor heat exchanger, an indoor expansion valve that adjusts a flow rate of the refrigerant flowing through the respective indoor heat exchanger, and
the controller regards the heating refrigerant charging completion condition as being met in a case where an opening degree of any of the plural indoor expansion valves has become equal to or greater than a predetermined threshold valve opening degree.

13. The air conditioning apparatus according to claim 4, wherein
the plural indoor units each have, on the liquid-side end of the indoor heat exchanger, an indoor expansion valve that adjusts a flow rate of the refrigerant flowing through the indoor heat exchanger, and
the controller regards the heating refrigerant charging completion condition as being met in a case where, in addition to the degree of subcooling of the refrigerant in any of the plural indoor heat exchangers becoming equal to or greater than the predetermined threshold degree of subcooling, an opening degree of any of the plural indoor expansion valves has become equal to or greater than a predetermined threshold valve opening degree.

14. The air conditioning apparatus according to claim 5, wherein
the plural indoor units each have, on the liquid-side end of the indoor heat exchanger, an indoor expansion valve that adjusts a flow rate of the refrigerant flowing through the indoor heat exchanger, and
the controller regards the heating refrigerant charging completion condition as being met in a case where, in addition to the temperature difference between the temperature of the refrigerant in any of the plural indoor heat exchangers and the temperature of the refrigerant flowing through the liquid refrigerant communication pipe becoming equal to or less than the predetermined threshold liquid temperature difference, an opening degree of any of the plural indoor expansion valves has become equal to or greater than a predetermined threshold valve opening degree.

15. The air conditioning apparatus according claim 2, wherein
the controller obtains the total volume of the plural indoor heat exchangers on the basis of volume data of the indoor heat exchangers of the plural indoor units connected to the outdoor unit.

16. The air conditioning apparatus according claim 3, wherein
the controller obtains the total volume of the plural indoor heat exchangers on the basis of volume data of the indoor heat exchangers of the plural indoor units connected to the outdoor unit.

17. The air conditioning apparatus according claim 4, wherein
the controller obtains the total volume of the plural indoor heat exchangers on the basis of volume data of the indoor heat exchangers of the plural indoor units connected to the outdoor unit.

18. The air conditioning apparatus according claim 5, wherein
the controller obtains the total volume of the plural indoor heat exchangers on the basis of volume data of the indoor heat exchangers of the plural indoor units connected to the outdoor unit.

19. The air conditioning apparatus according claim 6, wherein
the controller obtains the total volume of the plural indoor heat exchangers on the basis of volume data of the indoor heat exchangers of the plural indoor units connected to the outdoor unit.

* * * * *